(12) United States Patent
Parla (10) Patent No.: US 12,306,986 B2
(45) Date of Patent: May 20, 2025

(54) PRIVACY PRESERVING SECURE ACCESS

(71) Applicant: Cisco Technology, Inc., San Jose, CA (US)

(72) Inventor: Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 18/091,092

(22) Filed: Dec. 29, 2022

(65) Prior Publication Data

US 2024/0070315 A1 Feb. 29, 2024

Related U.S. Application Data

(60) Provisional application No. 63/400,146, filed on Aug. 23, 2022.

(51) Int. Cl.
*G06F 21/62* (2013.01)

(52) U.S. Cl.
CPC .............................. *G06F 21/6245* (2013.01)

(58) Field of Classification Search
CPC . G06F 21/6245; H04L 63/0407; H04L 63/10; H04L 63/102
See application file for complete search history.

(56) References Cited

U.S. PATENT DOCUMENTS

| | | | | |
|---|---|---|---|---|
| 9,015,819 B2 * | 4/2015 | Zhang | ................. | H04L 63/0815 726/8 |
| 11,595,215 B1 * | 2/2023 | Madden | .............. | H04L 63/0807 |
| 11,770,376 B2 * | 9/2023 | Cook | .................. | H04L 63/0892 726/5 |
| 2006/0155993 A1 * | 7/2006 | Busboon | ................. | H04L 9/321 713/169 |
| 2011/0314532 A1 * | 12/2011 | Austin | ................ | H04L 63/0892 726/8 |
| 2012/0254957 A1 * | 10/2012 | Fork | ..................... | H04L 9/3213 726/6 |

(Continued)

OTHER PUBLICATIONS

Lockhart Hal et al. "Security Assertion Markup Language(SAML) V2.0 Technical Overview" [Online], [Retrieved on: Jan. 10, 2025], OASIS Open 2008, Retrieved from: <https://docs.oasis-open.org/security/saml/Post2.0/sstc-saml-tech-overview-2.0-cd-02.pdf> (Year: 2008).*

*Primary Examiner* — Eric W Shepperd
(74) *Attorney, Agent, or Firm* — Lee & Hayes, P.C.

(57) ABSTRACT

Techniques for preserving privacy while still allowing secure access to private resources. Among other things, the techniques may include receiving a request to provide a remote device with access to a private resource. In some instances, the request may be redirected to an identity provider service to authenticate the user of the remote device to maintain anonymity of an identity of the user. The techniques may also include receiving an indication of an entitlement-set provided by the identity provider service, the indication of the entitlement-set indicative of whether the user is entitled to access the resource without revealing the identity of the user. The techniques may also include at least one of authorizing the remote device to access the resource or refraining from authorizing the remote device to access the resource based at least in part on the indication of the entitlement-set.

20 Claims, 5 Drawing Sheets

(56) References Cited

U.S. PATENT DOCUMENTS

| | | | |
|---|---|---|---|
| 2012/0324592 A1 | 12/2012 | Korablev et al. | |
| 2015/0007263 A1* | 1/2015 | Stewart | H04L 63/0815 |
| | | | 726/3 |
| 2015/0149530 A1* | 5/2015 | Maret | H04L 67/563 |
| | | | 709/203 |
| 2017/0099299 A1* | 4/2017 | Sutton | H04L 63/10 |
| 2017/0353444 A1* | 12/2017 | Karangutkar | H04L 63/102 |
| 2018/0203991 A1 | 7/2018 | Drake et al. | |
| 2018/0278603 A1* | 9/2018 | Yabe | H04L 63/08 |
| 2019/0199729 A1 | 6/2019 | Yared et al. | |
| 2020/0076794 A1* | 3/2020 | de Boer | H04L 9/3213 |
| 2020/0358615 A1* | 11/2020 | Smolny | H04L 9/3234 |
| 2020/0358756 A1 | 11/2020 | Rose et al. | |
| 2021/0006566 A1* | 1/2021 | Dunjic | H04L 63/0807 |
| 2021/0083873 A1* | 3/2021 | Harris | H04L 9/3297 |
| 2021/0084044 A1* | 3/2021 | Choyi | G06Q 20/383 |
| 2021/0218742 A1 | 7/2021 | Cook et al. | |

\* cited by examiner

PRIVACY PRESERVING SECURE ACCESS

RELATED APPLICATIONS

This application claims priority to U.S. Provisional Application No. 63/400,146, titled "Privacy Preserving Zero Trust," and filed on Aug. 23, 2022, the entire contents of which is incorporated herein by reference in its entirety and for all purposes.

TECHNICAL FIELD

The present disclosure relates generally to techniques for, among other things, using entitlements instead of user identity to preserve privacy while still allowing secure access to private resources.

BACKGROUND

Privacy is of paramount concern for both end users and enterprises. Typically, when a secure access solution is offered to a user, it comes with a requirement that user identity be part of the end-to-end solution. This is why users typically log into a virtual private network solution, or similar, with some form of username or email address that can be used to map that user to a group, and that group is typically where entitlements are created for that user.

Additionally, cloud-delivered secure access solutions are becoming increasingly popular with vendors providing different secure access solutions as a software as a service (SaaS) offering. However, unlike traditional remote access solutions where only the enterprise knew who the user, group, and entitlements were, these cloud-delivered solutions often include all of those pieces of information in the cloud-delivered SaaS offering itself. In other words, the enterprise's privacy is being affected by the delivery model of these cloud-delivered offerings for secure access. For instance, a user's email address, directory-groups, and resource entitlements are all know to the cloud provider instead of being private to just the enterprise itself.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various technologies for using entitlements instead of user identity to preserve privacy while still allowing secure access to private resources. By way of example, and not limitation, the techniques described herein may include receiving, at an access provider service, a first mapping of entitlement-sets to private resources associated with an enterprise. The access provider service may also receive, from a resource of the private resources, a request to provide a remote device with access to the resource. In some examples, it may be meant that an identity of a user of the remote device is to remain unknown to the access provider service. Based at least in part on receiving the request, the access provider service may redirect the request to an identity provider service to authenticate the user of the remote device. In some examples, the identity provider service may have access to a second mapping of user identities to the entitlement-sets. Additionally, in some instances, it may be meant that an identity of the resource to be accessed is to remain unknown to the identity provider service. The techniques may also include receiving, at the access provider service and from the resource, a bearer token provided by the identity provider service. In some instances, the bearer token may be indicative of an entitlement-set associated with the user. For instance, the entitlement-set may indicate whether the user of the remote device is entitled to access the resource without revealing, to the access provider service, the identity of the user. In some examples, the techniques may also include authorizing, by the access provider service, the remote device to access the resource based at least in part on the entitlement-set indicating that the user is entitled to access the resource. Additionally, or alternatively, the access provider service may refrain from authorizing the remote device to access the resource based at least in part on the entitlement-set failing to indicate that the user is entitled to access the resource.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

As noted above, cloud-delivered secure access solutions are becoming increasingly popular with vendors providing different SaaS secure access solutions. However, unlike traditional remote access solutions where only the enterprise knew who the user, group, and entitlements were, these cloud-delivered solutions often include all of those pieces of information in the cloud-delivered SaaS offering itself. In other words, the enterprise's privacy is being affected by the delivery model of these cloud-delivered offerings for secure access. For instance, a user's email address, directory-groups, and resource entitlements are all know to the cloud provider instead of being private to just the enterprise itself.

This application is directed to techniques for using entitlements instead of user identity to preserve privacy while still allowing secure access to private resources. For example, according to the technologies described herein, entitlements may be bound cryptographically to a user without the need to directly convey who the user is to access those entitlements. In this way, no single cloud vendor has knowledge of both the user and the entitlements (e.g., what private resource the user accessed) in their cloud ecosystems, while ensuring that an enterprise can still correlate that information together to facilitate auditing and logging purposes. In some examples, the technologies of this disclosure include two distinct elements to separate authentication mechanisms from authorization mechanisms in a way that preserves privacy. However, unlike a typical identity provider (e.g., SAML) type of system, the entitlement(s) is/are not directly conveyed in the protocol exchange. Instead, all that is conveyed is either one or more entitlement-sets that the user is associated with or, alternatively, an encrypted token that carries the entitlements directly, but in a way that prevents the identity provider (e.g., SAML) from knowing about the entitlements themselves.

In some examples, two distinct entities may, separately, authenticate and authorize access without either party knowing all of the elements, hence preserving privacy. For instance, a cloud vendor identity provider (e.g., AuthN) may have access to a first mapping of users to entitlement-sets, while a cloud vendor access provider (e.g., AuthZ) may have access to a second mapping of entitlements-sets to a set of private resources/entitlements.

As used herein, an "entitlements-label" does not necessarily mean an actual Active Directory (or similar) group. Instead, an entitlements-label may be associated with a normal access group ecosystem but does not need to explicitly be the same or even convey the actual group information associated with an enterprise. For example, a user "Kayce" might be part of the "Engineering and Employee" Active Directory groups, but the entitlements-label for the entitlement might simply be named "Entitlement-X," thereby intentionally not conveying to $3^{rd}$ parties what the actual Active Directory groups are that Kayce belongs to. In fact, the entitlements-label used for entitlement conveyance can, in some example, even be a cryptographic hash or other format that prevents information leakage, including a random value. In some cases, the only requirement may be that the entitlements-label be associated with a set of entitlements in a way that the access provider (e.g., AuthZ system) can apply enforcement policies on a per-session basis.

By design, these two, separate systems (e.g., access provider and identity provider) are independent of one another in a way that allows cloud vendors to offer secure access solutions while not directly knowing the end user information associated with the entitlements. Despite this, however, the enterprise is still able to stitch the context together for reporting or auditing purposes in a way where only the enterprise knows both the identities of the users, as well as what resources those users accessed.

It will be understood by those having ordinary skill in the art that there are a number of different possible embodiments of how the technologies disclosed herein can be implemented. For example, entitlement-sets can be some type of tags associated with a user (e.g., Employee, Human Resources, Legal, Engineering, R&D, Information Technology, Administration, etc.), which is the typical way of conveying group membership in systems like Active Directory. Entitlement-sets may also be unaffiliated with Active Directory groups or can be indirectly affiliated with Active Directory groups in a way that preserves enterprise privacy. For example, "Entitlement-X" might map back to being a member of "Employees" and "Engineering," but only the enterprise knows that fact and the cloud vendor identity provider (e.g., AuthN) and cloud vendor access provider (e.g., AuthZ) cannot infer or deduce that from the entitlements-label/entitlements-set.

In another example, entitlement-sets may be encrypted in the authentication tokens (e.g., bearer tokens) in a way that only the cloud vendor access provider enforcing the entitlement access (e.g., AuthZ) can interpret. In this system, the authenticator or identity provider (e.g., AuthN) may be unaware of the entitlement contents and acts as a conveyor of the encrypted entitlements associated with a given user so as to abstract away the user identity in the process. In such a system, the enterprise holds the keys used to encrypt/decrypt the entitlements and acts as a broker for the authentication and access components. The identity provider (e.g., AuthN) would request the encrypted entitlements from the enterprise for a user, while the access provider (e.g., AuthZ) would request the unencrypted entitlements to enforce from the enterprise for that specific bearer token, thus preserving the anonymity of the user from the access provider. In examples, standard cryptographic techniques can be used to ensure the encrypted payloads are not the same even if the internal data is the same (e.g., salting). In such a solution as is described herein, only the enterprise knows all of the information needed to audit what a user accessed and the separate providers/vendors only have what is necessary to perform their specific tasks of authentication or authorization.

By way of example, and not limitation, a method according to the technologies disclosed herein may include receiving, at an access provider service, a first mapping of entitlement-sets to private resources associated with an enterprise. In some examples, the access provider service may be provided by a first cloud vendor. In some examples, the first mapping of the entitlement-sets to private resources (or entitlements as referred to herein) may be received from the enterprise. In some examples, the first mapping may be provided to the access provider service on demand or in advance to receiving resource authorization requests (e.g., whenever mappings are updated, etc.). In some examples, the private resources may be applications, services, or other private resources offered by an enterprise (e.g., a secure banking web application, a virtual machine, etc.). In examples, the first mapping may be indicative of one or more respective, private enterprise resources that a respective entitlement-set is authorized to access without revealing identities of users associated with the respective entitlement-set.

In some examples, the method may also include receiving, at the access provider service and from a resource of the private resources, a request to provide a remote device with access to the resource, wherein an identity of a user of the remote device is to be unknown to the access provider service. For instance, the request may be to provide the remote device with access to their bank account information. In examples, because the access provider has no knowledge of the user's identity, the access provider may not determine what the user's entitlements are. As such, the method may include redirecting, by the access provider service, the request to an identity provider service to authenticate the user of the remote device. For instance, the identity provider service may have access to a second mapping of user identities to entitlement-sets. In some examples, the second mapping may include, for each user identity of the user identities, a respective entitlement-set for each user identity without revealing which private resources the entitlement-set/user has access to. In examples, the identity provider service may be unrelated to the access provider service (e.g., different cloud vendors).

In some examples, the identity provider service may authenticate the user in response to the redirect. For instance, the identity provider service may determine the identity of the user and, in turn, an entitlement-set associated with the user. That is, the identity provider may determine an entitlements-label associated with the user. For instance, the identity provider may determine that the user is mapped to "Entitlement-X," which gives the user access to private resources X, Y, and Z, for example. However, the identity provider may not have knowledge of the actual resources the entitlements-label gives the user access to, just that the user is associated with that specific entitlements-set. In examples, the identity provider may return the entitlements-label (or bearer token, etc.) to the client device, the private resource, etc., and redirect so that the entitlements-label is sent to the access provider.

In some examples, the access provider service may receive the entitlements-label (e.g., bearer token, etc.) provided by the identity provider service. For instance, the access provider service may receive the entitlements-label from the resource/private resource, which was provided by the identity provider. In some examples, the entitlements-label and/or bearer token may be indicative of an entitlement-set associated with the user. The entitlement-set may indicate whether the user of the remote device is entitled to access the resource without revealing, to the access provider service, the identity of the user. In other words, the entitlements-label may indicate whether the remote device/user is authorized to access the private resource without actually revealing the user's identity.

In some examples, the method may include authorizing, by the access provider service, the remote device to access the resource based at least in part on the entitlement-set indicating that the user is entitled to access the resource. Additionally, or alternatively, the method may include refraining from authorizing, by the access provider service, the remote device to access the resource based at least in part on the entitlement-set failing to indicate that the user is entitled to access the resource.

According to the techniques described herein, the identity of a user can remain unknown to the access provider service throughout authorization of the user, and the identity of the resource being accessed by the user may remain unknown to the identity provider service throughout authentication of the user. However, the enterprise may still be able to determine the identity of the user, what they accessed, when they accessed it, what device they used, etc. based on information stitched together from both of these separate entities (e.g., the identity provider and the access provider).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
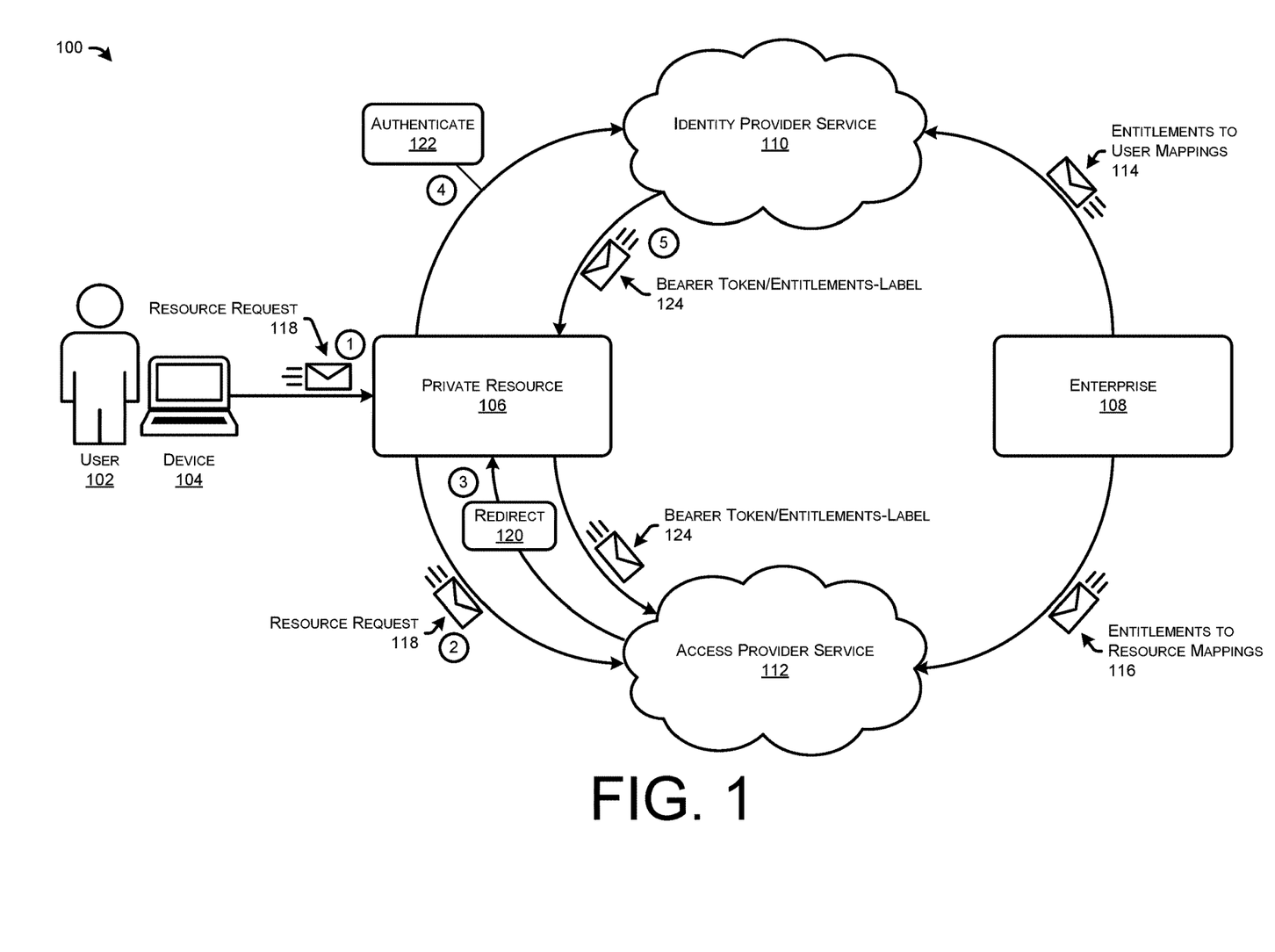
FIG. 1 illustrates an example architecture that may implement various aspects of the technologies described herein for using entitlements to preserve privacy while still allowing secure access to private resources.

FIG. 1 illustrates an example architecture 100 that may implement various aspects of the technologies described herein for using entitlements to preserve privacy while still allowing secure access to private resources. For instance, the user 102 of the device 104 may be attempting to access the private resource 106, which may be associated with the enterprise 108.

In some examples, the user 102 may be associated with a specific identity. For instance, a first name of the user may be "Kayce," a last name of the user may be "Wheeler," an email address of the user may be "kaycewheeler@example.com," and/or the like. Additionally, in some examples, the user 102 may be associated with one or more active directory groups and/or entitlement-sets. For instance, the user 102 may be associated with the active directory groups of "Employees," "Security," and "Administration." In some examples, the entitlement-sets that the user 102 is associated with may be represented by one or more entitlements-label(s), encrypted keys (e.g., bearer tokens), and/or the like. The entitlement-sets of the user 102 may indicate whether the user 102 is authorized to access the private resource 106 using the device 104, as well as whether the user 102 is authorized to access other private resources using the device 104 and/or other devices.

In some examples, the device 104 may be any electronic device with network connectivity, such as a laptop, personal computer, smart phone, tablet, smart television, or the like. As shown, in FIG. 1, the user 102 may attempt to access the private resource using the device 104. For instance, the device 104 may communicate with the private resource 106 over one or more network(s), such as the internet, cellular networks, wide area networks, or the like.

The private resource 106 may represent a private resource of the enterprise 108. For instance, the enterprise 108 may be a bank and the private resource 106 may be a web-based banking application where the user 102 is attempting to check account balances, make payments, transfer money between accounts, or the like. As another example, the enterprise 108 may be a business and the private resource 106 may be a virtual machine or other enterprise 108 resource that the user 102 is accessing to be able to work from their dwelling or another remote location.

As shown in FIG. 1, the architecture 100 also includes an identity provider service 110 and an access provider service 112. In some examples, the identity provider service 110 may receive entitlements to user mappings 114 from the enterprise 108. In some examples, the identity provider service 110 may receive these entitlements to user mappings 114 from the enterprise 108 on demand (e.g., when authentication requests are received), on a time-period basis (e.g., every day, every week, etc.), dynamically (e.g., as entitlements to user mappings change), and/or the like. As such, in some instances, the identity provider service 110 may store the entitlements to user mappings 114 at a location that is accessible to the identity provider service. In some examples, the entitlements to user mappings 114 may include respective entitlement-sets (e.g., entitlements-labels, bearer tokens, etc.) associated with respective users without revealing which private resource(s) the entitlement-set/user has access to. In some examples, the identity provider service 110 may authenticate the user 102 (e.g., perform AuthN functionality). For instance, the identity provider service 110 may determine the identity of the user 102 and, in turn, an entitlement-set associated with the user 102. That is, the identity provider service 110 may determine an entitlements-label associated with the user 102. For instance, the identity provider service 110 may determine that the user 102 is mapped to "Entitlement-X," which gives the user 102 access to the private resource 106. However, the identity provider service 110 may not have knowledge of the actual resources the entitlements-label gives the user 102 access to, just that the user 102 is associated with that specific entitlements-set/label.

In examples, the access provider service 112 may be capable of authorizing the user 102 and/or the user device 104 to access the private resource 106 (e.g., perform AuthZ functionality). For instance, the access provider service 112 may receive entitlements to resource mappings 116 from the enterprise 108 and use these mappings to authorize private resource 106 access. In some examples, the access provider service 112 may receive, from the private resource 106, requests to provide remote devices/users with access to private resources. In some examples, the access provider service 112 may receive entitlements-labels (e.g., bearer tokens, etc.) provided by the identity provider service 110. For instance, the access provider service 112 may receive the entitlements-label from the resource/private resource 106, which was provided by the identity provider service 110. In some examples, the entitlements-label and/or bearer token may be indicative of an entitlement-set associated with the user 102. The entitlement-set may indicate whether the user 102 of the remote device 104 is entitled to access the private resource 106 without revealing the identity of the user 102 to the access provider service 112. In other words, the access provider service 112 may utilize the entitlements-label to determine whether the remote device/user is authorized to access the private resource 106 without needing to ever determine the identity of the user 102 and/or identity of the device 104. In some examples the access provider service 112 may authorize the remote device 104 and/or user 102 to access the private resource 106 based at least in part on the entitlement-set indicating that the user 102 is entitled to access the private resource 106 on the device 104. Additionally, or alternatively, the access provider service 112 may refrain from authorizing the remote device 104 and/or user 102 to access the private resource 106 based at least in part on the entitlement-set failing to indicate that the user 102 is entitled to access the private resource 106 on the device 104.

Also shown in FIG. 1 is an example workflow associated with authenticating and authorizing the user 102 and/or remote device 104 to access the private resource 106 according to the privacy preserving technologies disclosed herein. At "1," a resource request 118 is received from the device 104 at the private resource 106. At "2," the resource request 118 is directed to the access provider service 112.

Because the access provider service 112 does not have access to the entitlements to user mappings 114, at "3," the access provider service issues a redirect 120 to authenticate 122 the user 102 of the device 104. At "4," based at least in part on the redirect 120, the identity provider service 110 may authenticate 122 the user 102 of the device 104. For instance, the identity provider service 110 may use the entitlements to user mappings 114 to determine the identity of the user 102, identity of the device 104, and/or the entitlements of that user 102 and/or device 104. The identity provider service 110 may then, at "5," redirect and return a bearer token/entitlements-label 124 to the to the access provider service 112.

After these steps have been completed and the access provider service 112 has the bearer token/entitlements-label 124, the access provider service 112 determines whether that bearer token/entitlements-label 124 has access for the private resource 106 based on the entitlements to resource mappings 116. In this way, the identity provider service 110 never knows the identity of the private resource 106 being accessed and the access provider service 112 never knows the identity of the user 102 accessing the private resource 106.

In some examples, the private resource 106 may be part of an entitlement-set which is identified by the bearer token/entitlements-label 124. For example, if a user 102, "Bob," is entitled to access the private resource 106, "private.example.com," the identity provider service 110 is authorizing Bob to get to the entitlement-set with bearer token/entitlements-label 124, "Label-X." The identity provider service 110 does not have knowledge that the bearer token/entitlements-label 124 (Label-X) maps back to the private resource 106 (private.example.com). In examples, the bearer token/entitlements-label 124 (Label-X) can be an ephemerally generated label for that entitlement-set which may, in some instances, not be fixed and can change per request (e.g., hash the name with a cryptographic operation with a nonce that only the Enterprise knows). In other words, the bearer token/entitlements-label 124 (Label-X) may just be an arbitrary identifier that only the enterprise 108 can resolve back to what private resource it is actually mapped to via the entitlement-set it belongs to. In examples, the access provider service 112 is given back the bearer token/entitlements-label 124 (Label-X) that unlocks the private resource 106 (private.example.com) because the user 102 authenticated and was authorized to access that private resource 106. But the access provider service 112 may not know who the user 102 is, only that the access provider service received a valid bearer token/entitlements-label to allow access to the private resource 106 for that session.

Figure 2:
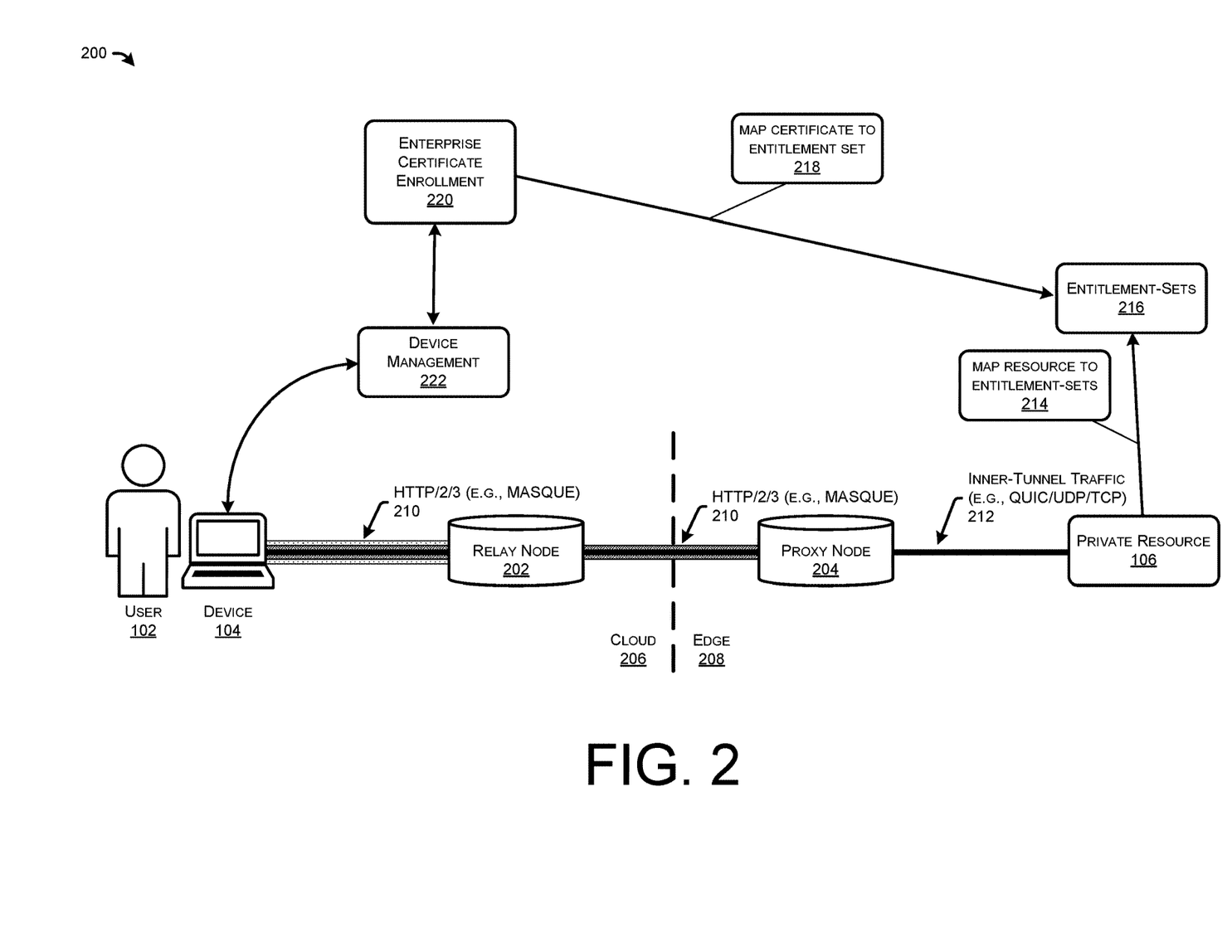
FIGS. 2 and 3 illustrate different example architectures that may perform the technologies disclosed herein using a MASQUE (Multiplexed Application Substrate over QUIC Encryption) protocol.
Figure 3:
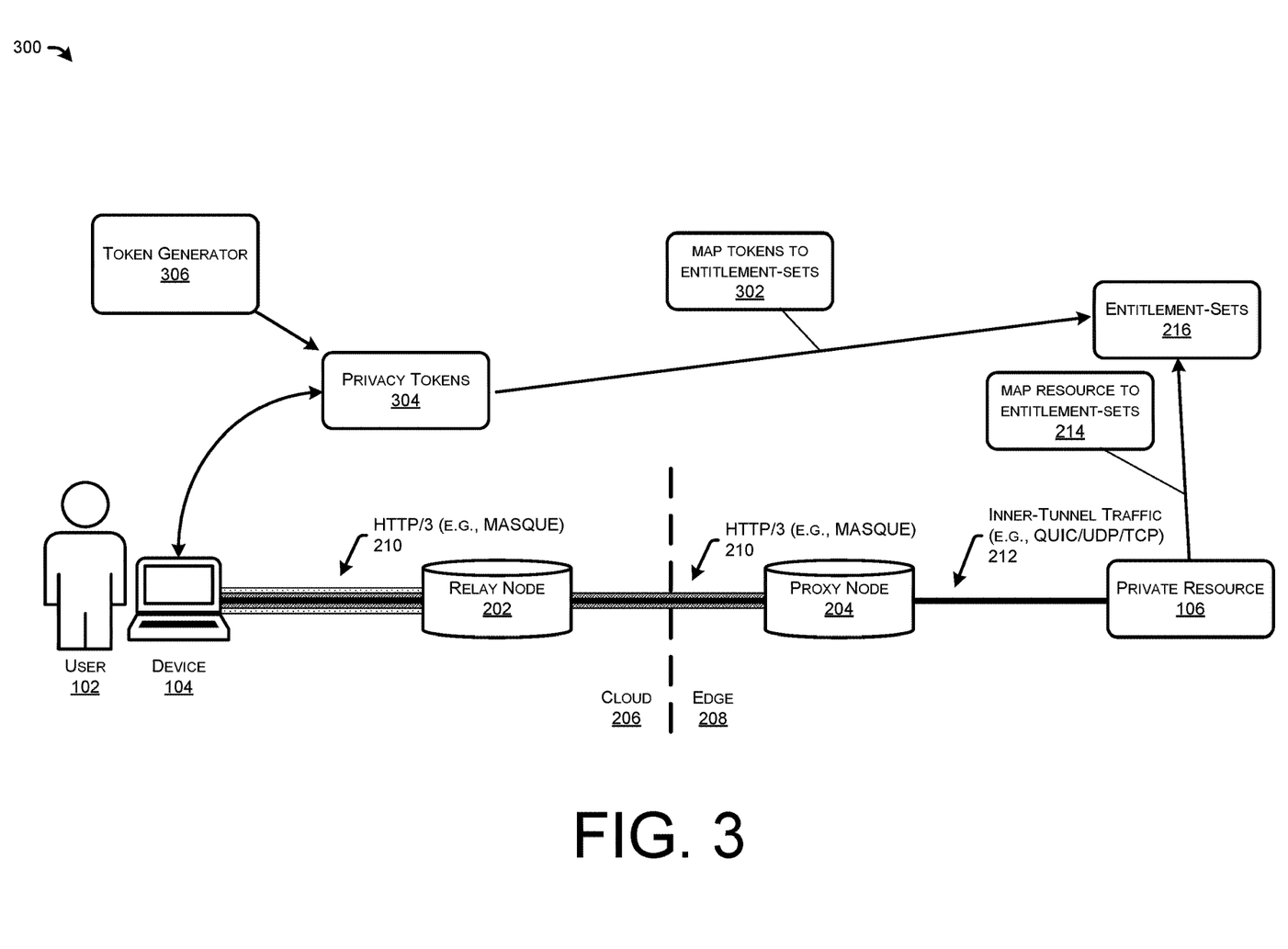

FIGS. 2 and 3 illustrate different example architectures 200 and 300 that may perform the technologies disclosed herein using a MASQUE protocol. For instance, as part of an enterprise relay offering (or any virtual private network (VPN), zero trust network access (ZTNA), or proxy access offering), it may be desirable to control user access to enterprise resources without knowing the identity of the user or the resource being accessed. For example, Bob@example.com might be allowed to access resource-.example.com from his enterprise managed laptop, but not from his personal laptop. In such a system, it may be desirable to deliver the solution as part of a cloud secure access service edge (SASE), ZTNA or VPN access offering.

As an example, if CloudScaler wanted to offer a cloud delivered enterprise SASE, ZTNA, or VPN access solution to Example, they would want to do so in a privacy preserving manner. CloudScaler should not know that Bob@example.com accessed build.example.com at 3:00 PM EST, but CloudScaler should be able to allow or deny that access to Bob@example.com without knowing any of that private enterprise information. Furthermore, CloudScaler should be able to prove that Bob@example.com was granted access to build.example.com at 3:00 PM EST and accessed it for 4 hours, without actually knowing that it was Bob or the build server. Similar to what is described above, CloudScaler knows Token-A was used to access Entitlement-X at 3:00 PM EST for 4 hours from his managed laptop. However, only Example knows that Token-A was assigned to Bob@example.com and that it unlocks Entitlement-X which is mapped to build.example.com.

In such an enterprise relay offering, users may be associated with tokens or certificates, tokens or certificates may unlock entitlement-sets, and application entitlements may be mapped to entitlement-sets. As such, a cloud-vendor delivered solution may know about tokens or certificates, but only the enterprise knows who was issued that token or certificate. Additionally, relaying may be used to ensure the cloud-vendor cannot see the application resource being accessed. Further, the egress proxy (e.g., end node of the relay) may validate that the certificate unlocks the entitlement set and then connect the application resource being requested from within that entitlement set. In some examples, since the egress proxy is on the enterprise premises, the cloud-vendor may not see what resource was accessed, nor can the cloud-vendor determine what user is associated with the token (or certificate) that unlocked the entitlement set for that resource. Instead, the cloud-vendor may know, authoritatively, that Token-A was used to unlock Entitlement-X to access a resource within that entitlement. The cloud-vendor does not know who is associated with Token-A or what resource(s) are part of Entitlement-X, and it may be that only the enterprise knows these facts. However, the cloud-vendor may be able to provide a Zero Knowledge Proof (ZKP) that Token-A was used to unlock Entitlement-X at 3:00 PM EST for 4 hours from a managed device, and the enterprise is the only one who knows who the user is associated with Token-A, what resources are in Entitlement-X, and which resource from within Entitlement-X was accessed. The cloud-vendor knows none of these facts, thus preserving enterprise privacy while delivering access with policy controls.

As shown in FIG. 2, the architecture 200 includes the user 102, the device 104, a relay node 202, a proxy node 204, and the private resource 106. In some examples, the relay node 202 may be positioned topographically such that it resides in the cloud 206. Additionally, in some examples, the proxy node 204 may be positioned topographically such that it resides at the edge 208 (e.g., enterprise edge or cloud edge).

In examples, the device 104, the relay node 202, and the proxy node 204 may be communicating with one-another over an HTTP/2/3 tunnel 210 (e.g., using a MASQUE or similar protocol). As such, the inner-tunnel traffic 212 may be QUIC (Quick UDP Internet Connections), UDP (User Datagram Protocol), or TCP (Transmission Control Protocol), or similar traffic.

In some examples, the private resource 106, which may be a private, enterprise resource or similar, may, at operation 214, map one or more resource to entitlement-sets 216. At operation 218, enterprise certificate enrollment 220 may map one or more certificates to the entitlement-sets 216.

The device management component 222 may comprise mobile device management (MDM) tools and/or enterprise mobility management (EMM) tools. In some examples, the device management component 222 may be a set of services and/or technologies designed to secure corporate data on enterprise employees' mobile devices. In some examples, the device management component 222 may comprise a suite of mobile management systems and services that protect intellectual property, specific processes that ensure the security of data, and systems that may integrate with a wide range of enterprise IT systems to meet a range of corporate concerns.

To carry out the example(s) from above, in such an enterprise relay architecture 200, the user 102 may be associated with a certificate, the certificate may be mapped to one or more entitlement-sets 216 (e.g., operation 218), and application/resource entitlements may be mapped to the entitlement-sets 216 (e.g., operation 214). As such, a cloud-vendor delivered solution may know about certificates, but only the enterprise knows that the user 102 was issued that certificate. Additionally, relaying (e.g., one or multiple relay nodes, such as relay node 202) may be used to ensure the cloud-vendor cannot see the application resource being accessed. Further, the proxy node 204 (e.g., end node of the relay or egress proxy) may validate that the certificate unlocks the entitlement-sets 216 and then connect the private resource 106 being requested from within that entitlement set. In some examples, since the proxy node 204 may be on the enterprise premises (e.g., edge 208), the cloud-vendor may not see what private resource 106 was accessed, nor can the cloud-vendor determine what user 102 is associated with the certificate that unlocked the entitlement set for that private resource 106. Instead, the cloud-vendor may know, authoritatively, that Certificate-A was used to unlock Entitlement-X to access a resource within that entitlement. The cloud-vendor may not know who is associated with Certificate-A or what resource(s) are part of Entitlement-X, and it may be that only the enterprise knows these facts. However, the cloud-vendor may be able to provide a Zero Knowledge Proof (ZKP) that Certificate-A was used to unlock Entitlement-X at 3:00 PM EST for 4 hours from a managed device 104, and the enterprise may be the only one who knows who the user is associated with Certificate-A, what resources are in Entitlement-X, and which private resource 106 from within Entitlement-X was accessed. The cloud-vendor may not know any of these facts, thus preserving enterprise privacy while delivering access with policy controls.

Turning to FIG. 3, the architecture 300 similarly includes the user 102, the device 104, a relay node 202, a proxy node 204, and the private resource 106. Similar to that of the architecture 200, in some examples, the relay node 202 may be positioned topographically such that it resides in the cloud 206. Additionally, in some examples, the proxy node 204 may be positioned topographically such that it resides at the edge 208 (e.g., enterprise edge or cloud edge).

In examples, the device 104, the relay node 202, and the proxy node 204 may be communicating with one-another over an HTTP/2/3 tunnel 210 (e.g., using a MASQUE or similar protocol). As such, the inner-tunnel traffic 212 may be QUIC (Quick UDP Internet Connections), UDP (User Datagram Protocol), or TCP (Transmission Control Protocol), or similar traffic.

In some examples, the private resource 106, which may be a private, enterprise resource or similar, may, at operation 214, map one or more resource to entitlement-sets 216. At operation 302, one or more privacy tokens 304 may be mapped to the entitlement-sets 216. In some examples, a token generator 306 (e.g., Privacy Pass, WebAuthN, JWT, etc.) may generate the privacy tokens 304 (e.g., bearer tokens).

To carry out the example(s) from above, in such an enterprise relay architecture 300, the user 102 may be associated with a privacy token 304, the privacy token 304 may be mapped to one or more entitlement-sets 216 (e.g., operation 302), and application/resource entitlements may be mapped to the entitlement-sets 216 (e.g., operation 214). As such, a cloud-vendor delivered solution may know about the privacy token 304, but only the enterprise knows that the user 102 was issued that privacy token 304. Additionally, relaying (e.g., one or multiple relay nodes, such as relay node 202) may be used to ensure the cloud-vendor cannot see the private resource 106 being accessed. Further, the proxy node 204 (e.g., end node of the relay or egress proxy) may validate that the privacy token 304 unlocks the entitlement-sets 216 and then connect the private resource 106 being requested from within that entitlement set. In some examples, since the proxy node 204 may be on the enterprise premises (e.g., edge 208), the cloud-vendor may not see what private resource 106 was accessed, nor can the cloud-vendor determine what user 102 is associated with the privacy token 304 that unlocked the entitlement set for that private resource 106. Instead, the cloud-vendor may know, authoritatively, that Privacy Token-A was used to unlock Entitlement-X to access a resource within that entitlement. The cloud-vendor may not know who is associated with Privacy Token-A or what resource(s) are part of Entitlement-X, and it may be that only the enterprise knows these facts. However, the cloud-vendor may be able to provide a Zero Knowledge Proof (ZKP) that Privacy Token-A was used to unlock Entitlement-X at 3:00 PM EST for 4 hours from a managed device 104, and the enterprise may be the only one who knows who the user 102 is associated with Privacy Token-A, what resources are in Entitlement-X, and which private resource 106 from within Entitlement-X was accessed. The cloud-vendor may know none of these facts, thus preserving enterprise privacy while delivering access with policy controls.

Figure 4:
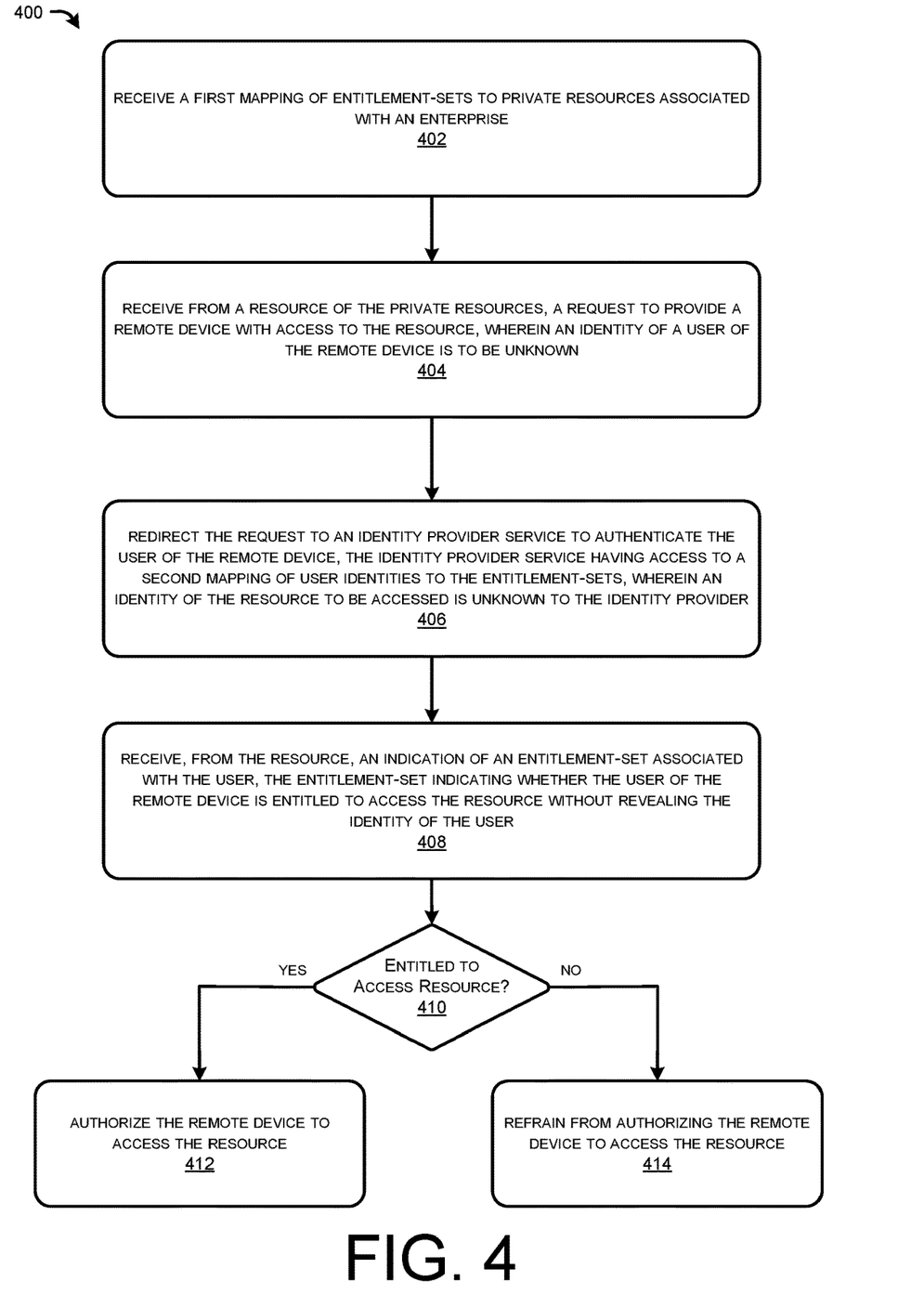
FIG. 4 is a flow diagram illustrating an example method associated with the techniques described herein for using entitlements to preserve privacy while still allowing secure access to private resources.

FIG. 4 is a flow diagram illustrating an example method 400 associated with the techniques described herein for using entitlements to preserve privacy while still allowing secure access to private resources. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 400 begins at operation 402, which includes receiving a first mapping of entitlement-sets to private resources associated with an enterprise. For instance, the access provider service 112 may receive the entitlements to resource mappings 116 from the enterprise 108. In some examples, the first mapping may be provided (e.g., to the access provider service) on demand or in advance to receiving resource authorization requests (e.g., whenever mappings are updated, etc.). In examples, the first mapping may be indicative of one or more respective, private enterprise resources that a respective entitlement-set is authorized to access without revealing identities of users associated with the respective entitlement-set. For instance, an entitlement-label "Label-X" may be associated with an entitlement-set allowing for access to resources "A," "B," and "C," while an entitlement label "Label-Y" may be associated a different entitlement-set allowing for access to resources "B," "C," and "D," but not "A."

At operation 404, the method 400 includes receiving from a resource of the private resources, a request to provide a remote device with access to the resource, wherein an identity of a user of the remote device is to be unknown. For instance, the access provider service 112 may receive the resource request 118 from the private resource 106, wherein the identity of the user 102 of the remote device 104 is to be unknown.

At operation 406, the method 400 includes redirecting the request to an identity provider service to authenticate the user of the remote device, the identity provider service having access to a second mapping of user identities to the entitlement-sets, wherein an identity of the resource to be accessed is unknown to the identity provider. For example, the access provider service 112 may redirect 120 the request to the identity provider service 110 to authenticate the user 102 of the remote device 104. The identity provider service 110 may have access to the entitlements to user mappings 114 to determine an entitlements-set of the user 102 and/or the device 104. In some examples, the entitlements to user mappings may include, for each user identity of the user identities, a respective entitlement-set for each user identity without revealing which private resources the entitlement-set/user has access to. In examples, the identity provider service may be unrelated to the access provider service (e.g., different cloud vendors).

In some examples, the identity provider service may authenticate the user in response to the redirect. For instance, the identity provider service may determine the identity of the user and, in turn, an entitlement-set associated with the user. That is, the identity provider may determine an entitlements-label associated with the user. For instance, the identity provider may determine that the user is mapped to "Entitlement-X," which gives the user access to private resources X, Y, and Z, for example. However, the identity provider may not have knowledge of the actual resources the entitlements-label gives the user access to, just that the user is associated with that specific entitlements-set. In examples, the identity provider may return an indication of the entitlement-set (e.g., entitlements-label, bearer token, etc.) associated with the user to the client device, the private resource, etc., and redirect so that the indication of the entitlement-set is sent to the access provider.

At operation 408, the method 400 includes receiving, from the resource the indication of an entitlement-set associated with the user, the entitlement-set indicating whether the user of the remote device is entitled to access the resource without revealing the identity of the user. For example, the access provider service 112 may receive the indication of the entitlement-set associated with the user 102 and/or the device 104 indicating whether the user 102 and/or the device 104 is entitled to access the private resource 106 without revealing the identity of the user 102. In other words, the indication of the entitlements-set may indicate whether the remote device/user is authorized to access the private resource without actually revealing the user's or device's identity, in some examples.

At operation 410, the method 400 includes determining whether the user and/or the remote device is entitled to access the resource. For instance, the access provider service 112 may determine whether the user 102 and/or the remote device 104 is entitled to access the private resource 106 based at least in part on the indication of the entitlement-set and the first mapping. For instance, if the entitlements-label and/or bearer token indicate that the entitlement-set includes access to the private resource, then access may be authorized. If the user 102 and/or the remote device 104 is entitled to access the private resource 106, then the method 400 may proceed to operation 412. Alternatively, if the user 102 and/or the remote device 104 is not entitled to access the private resource 106, then the method 400 may proceed to operation 414.

At operation 412, the method 400 includes authorizing the remote device to access the resource. For instance, the access provider service 112 may authorize the user 102 and/or the remote device 104 to access the private resource 106. At operation 414, the method 400 includes refraining from authorizing the remote device to access the resource. For instance, the access provider service 112 may refrain from authorizing the user 102 and/or the remote device 104 to access the private resource 106.

Figure 5:
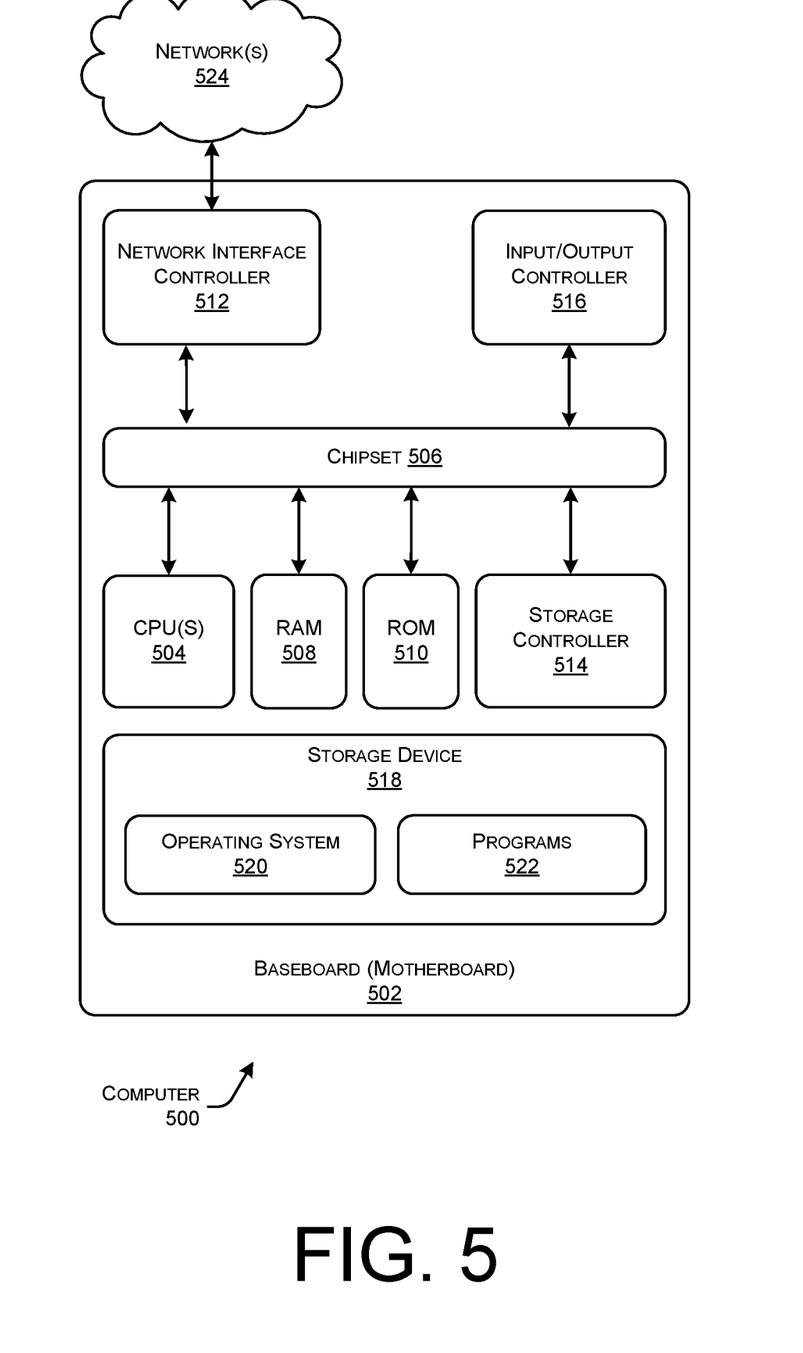
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network. The chipset 506 can include functionality for providing network connectivity through a NIC 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture 100 and or any components included therein, may be supported by one or more devices similar to computer 500. Stated otherwise, some or all of the operations performed by the architecture 100, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-4, and herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for using entitlements instead of user identity to preserve privacy while still allowing secure access to private resources, as well as other programs or processes associated therewith.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, at an access provider service, a first mapping of entitlement-sets to private resources associated with an enterprise;
receiving, at the access provider service and from a resource of the private resources, a request to provide a remote device with access to the resource, wherein an identity of a user of the remote device is to be unknown to the access provider service;
redirecting, by the access provider service, the request to an identity provider service to authenticate the user of the remote device, the identity provider service having access to a second mapping of user identities to the entitlement-sets, wherein an identity of the resource to be accessed is unknown to the identity provider service;
receiving, at the access provider service and from the resource, a bearer token provided by the identity provider service, the bearer token indicative of an entitlement-set associated with the user, the entitlement-set indicating whether the user of the remote device is entitled to access the resource without revealing, to the access provider service, the identity of the user; and
at least one of:
authorizing, by the access provider service, the remote device to access the resource based at least in part on the entitlement-set indicating that the user is entitled to access the resource; or
refraining from authorizing, by the access provider service, the remote device to access the resource based at least in part on the entitlement-set failing to indicate that the user is entitled to access the resource.

2. The method of claim 1, wherein the identity provider service is unrelated to the access provider service.

3. The method of claim 1, wherein the identity of the user remains unknown to the access provider service throughout authorization and the identity of the resource remains unknown to the identity provider service throughout authentication of the user.

4. The method of claim 1, wherein the identity provider service is a first cloud vendor and the access provider service is a second cloud vendor.

5. The method of claim 1, wherein the first mapping is indicative of one or more respective, private enterprise resources that a respective entitlement-set is authorized to access without revealing identities of users associated with the respective entitlement-set.

6. The method of claim 1, wherein the second mapping includes, for each user identity of the user identities, a respective entitlement-set for each user identity without revealing which private resources the entitlement-set has access to.

7. The method of claim 1, wherein the enterprise is capable of determining the identity of the user and the identity of the resource accessed by the user.

8. A system associated with an access provider service, the system comprising:
one or more processors; and one or more non-transitory computer-readable media storing instructions that, when executed by the one or more processors, cause the system to perform operations comprising:
  receiving a first mapping of entitlement-sets to private resources associated with an enterprise;
  receiving, from a resource of the private resources, a request to provide a remote device with access to the resource, wherein an identity of a user of the remote device is to be unknown to the access provider service;
  redirecting the request to an identity provider service to authenticate the user of the remote device, the identity provider service having access to a second mapping of user identities to the entitlement-sets, wherein an identity of the resource to be accessed is unknown to the identity provider service;
  receiving, from the resource, a bearer token provided by the identity provider service, the bearer token indicative of an entitlement-set associated with the user, the entitlement-set indicating whether the user of the remote device is entitled to access the resource without revealing, to the access provider service, the identity of the user; and
  at least one of:
    authorizing the remote device to access the resource based at least in part on the entitlement-set indicating that the user is entitled to access the resource; or
    refraining from authorizing the remote device to access the resource based at least in part on the entitlement-set failing to indicate that the user is entitled to access the resource.

9. The system of claim 8, wherein the identity provider service is unrelated to the access provider service.

10. The system of claim 8, wherein the identity of the user remains unknown to the access provider service throughout authorization and the identity of the resource remains unknown to the identity provider service throughout authentication of the user.

11. The system of claim 8, wherein the identity provider service is a first cloud vendor and the access provider service is a second cloud vendor.

12. The system of claim 8, wherein the first mapping is indicative of one or more respective, private enterprise resources that a respective entitlement-set is authorized to access without revealing identities of users associated with the respective entitlement-set.

13. The system of claim 8, wherein the second mapping includes, for each user identity of the user identities, a respective entitlement-set for each user identity without revealing which private resources the entitlement-set has access to.

14. The system of claim 8, wherein the enterprise is capable of determining the identity of the user and the identity of the resource accessed by the user.

15. One or more non-transitory computer-readable media storing instructions that, when executed by one or more processors associated with an access provider service, cause the access provider service to perform operations comprising:
  receiving a first mapping of entitlement-sets to private resources associated with an enterprise;
  receiving, from a resource of the private resources, a request to provide a remote device with access to the resource, wherein an identity of a user of the remote device is to be unknown to the access provider service;
  redirecting the request to an identity provider service to authenticate the user of the remote device, the identity provider service having access to a second mapping of user identities to the entitlement-sets, wherein an identity of the resource to be accessed is unknown to the identity provider service;
  receiving, from the resource, a bearer token provided by the identity provider service, the bearer token indicative of an entitlement-set associated with the user, the entitlement-set indicating whether the user of the remote device is entitled to access the resource without revealing, to the access provider service, the identity of the user; and
  at least one of:
    authorizing the remote device to access the resource based at least in part on the entitlement-set indicating that the user is entitled to access the resource; or
    refraining from authorizing the remote device to access the resource based at least in part on the entitlement-set failing to indicate that the user is entitled to access the resource.

16. The one or more non-transitory computer-readable media of claim 15, wherein the identity provider service is unrelated to the access provider service.

17. The one or more non-transitory computer-readable media of claim 15, wherein the identity of the user remains unknown to the access provider service throughout authorization and the identity of the resource remains unknown to the identity provider service throughout authentication of the user.

18. The one or more non-transitory computer-readable media of claim 15, wherein the identity provider service is a first cloud vendor and the access provider service is a second cloud vendor.

19. The one or more non-transitory computer-readable media of claim 15, wherein:
  the first mapping is indicative of one or more respective, private enterprise resources that a respective entitlement-set is authorized to access without revealing identities of users associated with the respective entitlement-set, and
  the second mapping includes, for each user identity of the user identities, a respective entitlement-set for each user identity without revealing which private resources the entitlement-set has access to.

20. The one or more non-transitory computer-readable media of claim 15, wherein the enterprise is capable of determining the identity of the user and the identity of the resource accessed by the user.

\* \* \* \* \*